April 27, 1943.    J. K. DELANO    2,317,523

PRODUCTION OF ENERGY FROM PYRO CRYSTALS AND MINERALS

Filed Aug. 28, 1940

INVENTOR.
James K. Delano
BY
ATTORNEYS

Patented Apr. 27, 1943

2,317,523

UNITED STATES PATENT OFFICE 2,317,523

PRODUCTION OF ENERGY FROM PYRO CRYSTALS AND MINERALS

James K. Delano, Rye, N. Y.

Application August 28, 1940, Serial No. 354,609

11 Claims. (Cl. 171—327)

My invention relates to the generation of electric energy by the application of heat to crystals or minerals and discloses a new and novel method of and apparatus for producing a constant electrical output from this source.

It is known that certain types of minerals or crystals produce electricity when heated and develop distinct positive and negative poles; other types develop electric potential by mechanical stress, compression, elongation, etc., without heating.

The first mentioned types of crystals are preferably employed in this invention; however it is quite possible that in certain crystals the two types are more or less combined or related. Crystals possessing the properties of the first mentioned type are herein referred to as pyro-electric crystals.

The list of pyro-electric crystals is quite numerous and not all minerals as yet have been tested under various conditions to determine their electric nature. The most commonly known include tourmaline, schorl, smithite, axinite, scolezite, prehnite, mesotype, boricite, mesolite, pyrite, haemotite, euxerite, annerodite, nohilte, uranotile, etc.

It is a general rule that the higher the dielectric property of the mineral (when cold) the higher its pyro-electric potential, and vice versa, the lower its dielectric or resistance, the lower the potential. With high dielectric types the energy developed is more or less of a static form while with the low types the energy is more like that produced by a thermocouple or voltic cell. I prefer to use the low dielectric types, being usually minerals or crystals having a large proportion of metal oxides or other salts in their chemical composition.

It is known that if certain substances in crystalline form are heated an electrical current will thereby be generated. However, when the temperature has reached certain predetermined points the output of electrical energy decreases and finally reaches zero.

It has been discovered that this decrease in current can be prevented and a substantially constant predetermined output of electrical energy obtained by impressing a potential difference on the terminals of the crystal. When a suitable potential difference is applied the falling off or decrease of the current is obviated and it then becomes possible to supply to the crystal a continuous input of heat energy and withdraw therefrom a continuous output of electrical energy.

There are various means of applying said potential difference which for the sake of a better term may be herein designated as a polarizing or ionizing potential. The preferred means in accordance with the present invention includes the use of elements having different electromotive potentials in the electromotive series, as for example, zinc and carbon, zinc and copper, tin and silver, etc. It has been found that when such elements are connected to the poles of the crystal having the same sign as the elements, respectively, and the said elements have been connected into an electrical circuit comprising the crystal and the elements, that a difference in potential may be thereby impressed on the crystal terminals. Such electromotive elements provide means of impressing the terminals of the crystal with a potential difference, which is convenient and has certain advantages including efficiency in heat conduction, as will hereinafter more fully be explained.

The invention includes both method and apparatus. In accordance with the method aspects of the invention, heat energy is applied to a pyro-electric crystalline substance or mineral while impressing a polarizing or ionizing electrical potential to the terminals of the crystal. This is preferably done by placing in electrical and mechanical contact with said terminals elements of the electromotive series having positive and negative polarity corresponding, respectively, to the poles of the crystal.

From the apparatus point of view the invention comprises a device for transforming heat energy into electrical energy comprising a pyroelectric crystal having positive and negative poles, the poles of said crystal being in contact with elements of the electromotive series having, respectively, positive and negative signs corresponding to the poles of the crystal with which they are in contact, and means to apply heat to said crystal and elements.

It is also the object of this invention to provide a method whereby a large grouping of small crystals may be employed for increased electric output and to provide good electrical contact between the positive terminals of the group and between the negative terminals of the group.

It is a further object of this invention to show that selection of the type of crystal used in combination with proper ionizing means will result in an increased electrical output.

The principles of the invention will be defined in the claims and illustrated by the following description.

By grouping a mass of independent small crystals that are connected in multiple, that is, all positive and negative poles being connected to two common terminals, a much more stable performance will result. Tourmaline, smithite, scolezite, etc. may be reduced to fine particles and yet each particle will, with heat, develop pyro energy in electric form, and by the means described and shown in the drawing the small crystals may be made to operate in multiple as a unit with greatly enhanced electrical output over a single large crystal of the same weight or mass. Due to the short length of the crystals, their resistance is lowered and the terminal surface is increased, and with low value ionizing voltages impressed on the multiple terminals they will give a continuous flow of electric energy, when heated.

For a better understanding of my invention, reference may be had to the accompanying drawing.

Figure 1:
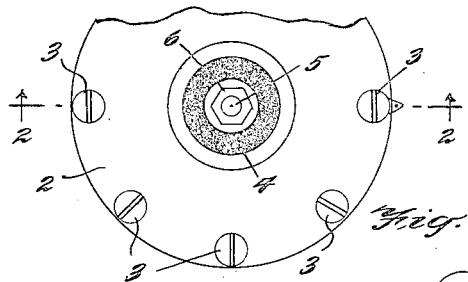
Fig. 1 is a top view of one of the forms of my invention.
Figure 2:
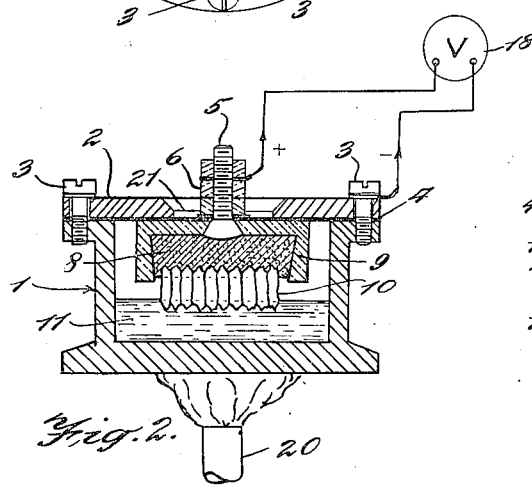
Fig. 2 is a sectional view on the line 2—2 of Fig. 1.

Referring to the drawing, Fig. 2 shows one of the arrangements to accomplish the objectives of this invention. Figs. 1 and 2 show a cup of any suitable metal as iron, etc. that has an extended bottom which is larger in diameter than the body portion. The inside of the cup is hollow. A metal cover 2 is provided with screws 3 for fastening it to the upper part of the cup which is flanged and tapped for the screws. The cover has a center opening 21 larger than the terminal clamping nuts 6 so that they do not make contact with the cover. An insulating washer of mica 4 is clamped between the cover and the flange at the upper end of the cup and centrally locates and supports the crystal element holder 9 by the central terminal screw 5 which is riveted into the center of the holder and securely clamps the holder against the mica washer 4 by the jam nuts 6 on terminal 5. The element holder 9 is in the form of a small cup of iron, copper or other electric conducting material with its edges slightly crimped, suspended with the opening in downward position by the terminal screw 5 and nuts 6. The crystals 10 are selected for uniformity in size and are arranged for assembling, first ascertaining each crystal's negative and positive pole.

A conducting cement 8 which consists of powdered carbon 50%, powdered iron 40%, copper dust 10% is mixed with sufficient water to which has been added a small amount of chloride of ammonia to make a stiff plastic paste. The element cup 9 is filled with this cement and while the cement is still plastic the crystals are assembled by placing them in the cement, stacking them so that each crystal's positive pole is covered by the cement. The selection of the diameter of the crystals will determine how many elements can be grouped in a given space. The stacked elements are aligned upright and the cement is allowed to set and dry. It is then baked to drive off any moisture that it may have retained and the unit is ready to assemble.

It is possible by subjecting the minute crystals while heated, to a strong electrostatic field and by agitating them on a vibrating shaker to have them identify and arrange their positive and negative poles for selection for assembly.

In place of the ingredients mentioned for the cement, it is possible to use a commercial iron cement known under the trade name of "Smooth On" by adding about 40% carbon dust. Other cements having conducting ability may be substituted.

The crystals will be firmly fixed in the cement if care has been taken to place them correctly.

The cup 1 is now heated and metallic zinc 11 is melted in it. The amount of zinc used should be sufficient to just cover the negative or lower ends of the crystals. The zinc should be in a fluid state and free from dross and scum, while the level is being determined.

The proper level determined, the element holder 9 is tightly fastened to the mica washer by means of the nuts 6 and screw 5. The cover 2 is assembled clamping the mica washer 4 between it and the cup, screws 3 being screwed firmly down on the cover to keep the interior of the cup sealed from the outside air which might cause oxidation of the zinc. The air within the casing may be exhausted and a vacuum maintained or the free space within the casing may be filled with an inert atmosphere or fluid at any desired pressure.

The unit is now ready for use. Heat is preferably to be applied at the bottom of the cup 1 which should always be kept level. The path of heat travel is to the zinc contacting the negative poles of the crystals, through the crystals to the carbon cement, then to the cover, and then dissipated. This construction prevents the poles of the crystals from having equal temperatures, as the carbon radiates the heat away from the positive poles so that these poles are at a lower temperature than the negative poles which are immersed in the melted zinc. This difference of temperature assists the polarizing voltage of the zinc-carbon terminals in preventing the dropping and reversal potential of the crystals. This is of some importance when the crystals are fairly large and of high resistance. An energy consuming device such as voltmeter 18 in Fig. 2 and 19 in Fig. 3 is connected to the terminals 5 and 3.

Figure 3:
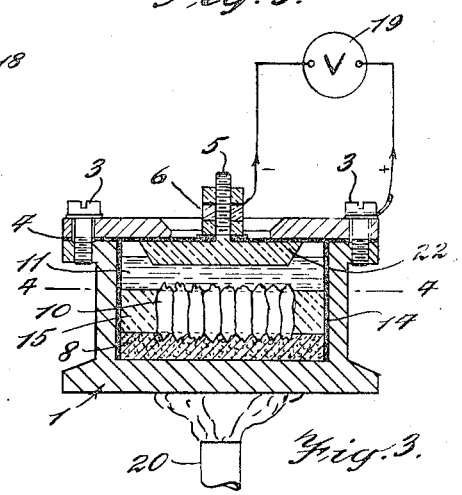
Fig. 3 is a sectional view of a modified form of my invention.

Another form of unit is shown at Fig. 3 of the drawing. The difference is that the bottom of the cup 1 holds the carbon cement 8 and that the interior wall of the cup is insulated by a mica tube 14 which extends to, but does not cover, the bottom so that the carbon may still contact the bottom of the cup. The crystal elements 10 are imbedded in the carbon cement 8 as in Fig. 2 and allowed to thoroughly dry. A second cement layer 15 is now placed over the crystals covering them sufficiently deep so that only a small section of the negative poles protrudes. This second cement can be any insulating ceramic cement or even china clay. After it is thoroughly dry the protruding poles are cleaned carefully by a soft wire brush and sufficient zinc 11 is added so that when melted it will cover the negative terminals. A center electrode 22 which may be made of iron, copper or other electrically conducting material is fastened to the mica washer 4 and is centrally located as in the other described unit. This electrode has a large foot and protrudes down into the zinc, making contact with it, and is the negative pole of the unit, the cup being the positive.

The advantage of this last described construction is that the unit does not require to be on an exact level for perfect operation and any impurities in the zinc will rise to the surface and not cause trouble at the terminals of the crystals. It also permits the zinc to be placed in the cup in a metallic state instead of molten when assembled.

Figure 5:
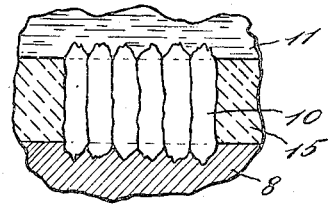
Fig. 5 is an enlarged fragmentary view of the crystals of Fig. 3, showing them held in the insulating cement with their poles in contact with the ionizing elements.
Figure 4:
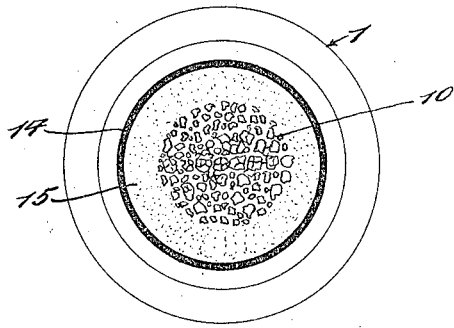
Fig. 4 is a section of Fig. 3 taken through the lines 4—4 of Fig. 3.

An enlarged fragmentary cross section of the cement and the crystals is shown at Fig. 5. A view is also shown in Fig. 4 looking down into the cup, showing the negative ends of the crystals projecting through the insulating cement. Numeral 20 represents the heating burners.

It is obvious that the melting point of the zinc may be raised or lowered by admixture with other metals. This may be necessary with the use of certain crystals which would disintegrate with temperatures as high as melting zinc. Other elements or compounds of the electrochemical series can be used in place of the carbon-zinc for ionization voltage. Best results are obtained by selecting combinations giving high potential differences.

In some cases the crystal or mineral may contain a substance that will function as one of the elements or contacts and it is then necessary only to employ another element or contact capable of providing a potential difference in relation to the first element.

Figure 6:
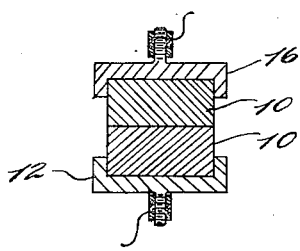
Fig. 6 is a cross section of a structure composed of striated crystals.

Certain crystals such as pyrite, or others of the class that are composed of striated layers, may be used to produce pyro-electricity by halving them and placing the halves in contact with the layers at right angles to each other. In this case each half or crystal becomes a pole and the terminal end may be contacted with a polarizing element by either clamping the element to the mineral or by electroplating the crystal terminals or poles with the positive or negative elements. Fig. 6 of the drawing shows the assembly of such an arrangement. The terminals 12, 16 are of copper and zinc and are crimped tightly to the two halves of the crystal 10—10. For the sake of clarity I have shown a single pair of crystals, it being easily understood that more than one pair, as shown, could be mounted in multiple or series relation.

It is understood that many deviations could be made from the arrangement shown and described herein, as the description and drawing are intended to show the invention in as simple a manner as possible, and that various other methods and means of accomplishing the same results would be within the scope of the appended claims. The crystals are intended to be illustrated only diagrammatically.

I claim:

1. The method of transforming heat energy into electrical energy which comprises applying heat to a pyro-electric crystal while impressing an electrical potential on the terminals of the crystal.

2. The method of transforming heat energy into electrical energy which comprises applying heat to a pyro-electric crystal while impressing an electrical potential on the terminals of the crystal, from poles in contact with said terminals said poles having positive and negative signs corresponding to the poles of the crystal.

3. The method of transforming heat into electrical energy which comprises applying heat to a pyro-electric crystal having positive and negative poles said poles being in contact with elements of the electromotive series having positive and negative polarity corresponding, respectively, to the poles of the crystal with which they are in contact, said elements being connected in an electrical circuit comprising said elements and crystal.

4. A device for transforming heat energy into electrical energy comprising a pyro-electric crystal having positive and negative poles, the poles of said crystal being in mechanical and electrical contact with elements of the electromotive series having positive and negative signs corresponding to the respective poles of the crystal with which they are in contact, means to apply heat to said crystal and elements and means to connect said elements in an electrical circuit.

5. A device for transforming heat energy into electrical energy comprising a pyro-electric crystal having positive and negative poles, the poles of said crystal being in contact with elements of the electromotive series having positive and negative signs corresponding to the respective poles of the crystal with which they are in contact, said crystal and elements being mounted within a heat conductive housing which is in electrically insulated relation to at least one of said elements, means to apply heat to said housing and means to connect said elements to an output circuit.

6. Device for transforming heat energy into electrical energy comprising a pyro-electric crystal having positive and negative poles, means to apply heat to the crystal and means to apply a potential difference to the terminals of the crystal to maintatin a substantially constant output of electrical energy while applying heat thereto.

7. Device for transforming heat energy into electrical energy comprising a pyro-electric crystal having positive and negative poles, means to apply heat to the crystal and means to apply a potential difference to the terminals of the crystal to maintain a substantially constant output of electrical energy while applying heat thereto, and means to connect said terminals to an operative output circuit.

8. A device for producing pyro-electricity by the heating of crystals comprising a group of said crystals arranged in multiple in respect to their positive and negative poles, a multiple connection with and between the negative poles of the group comprising a negative element of the electro-chemical series and a multiple connection with and between the positive poles of the group comprising a positive element of the series, the positive and negative elements acting as terminals for the pyro-electricity produced by the heating of the group of crystals.

9. A method of producing electricity from crystals, which comprises heating the crystals while they are contacted at their electrical poles with elements of the electro-chemical series that are of the same sign as the poles, the elements acting as collectors for the electric potential of the crystal.

10. A method of producing electricity by heating crystals which comprises heating the crystals while they are contacted at their electrical terminals by elements of the electro-chemical series that are of the same electrical sign as the terminals, the elements thereby acting as output terminals for the current of the crystals.

11. A method of producing electricity by the heating of minerals, comprising a pyro-electric mineral having elements of the electro-chemical series arranged as terminal contacts for collection of the polar current, said elements corresponding in polarity to the polarity of the electric potential derived from the mineral.

JAMES K. DELANO.